A. A. DUFNER.
VEGETABLE CUTTER.
APPLICATION FILED OCT. 20, 1913.
1,112,991.
Patented Oct. 6, 1914.
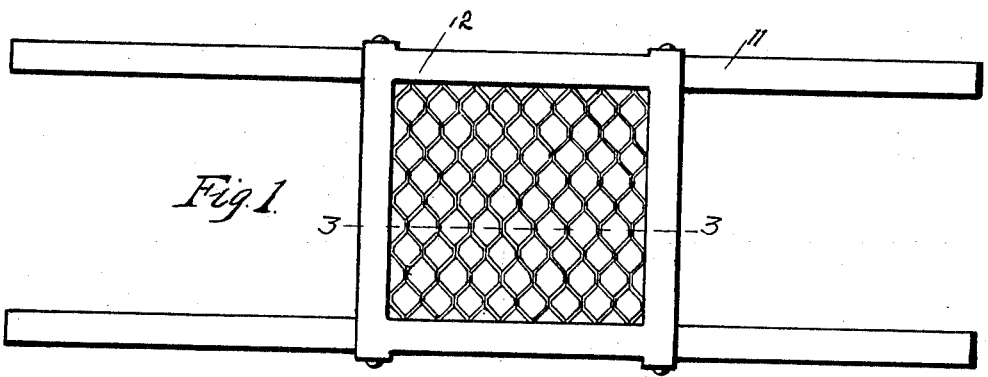
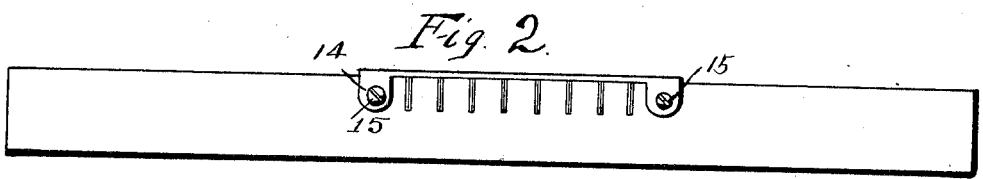
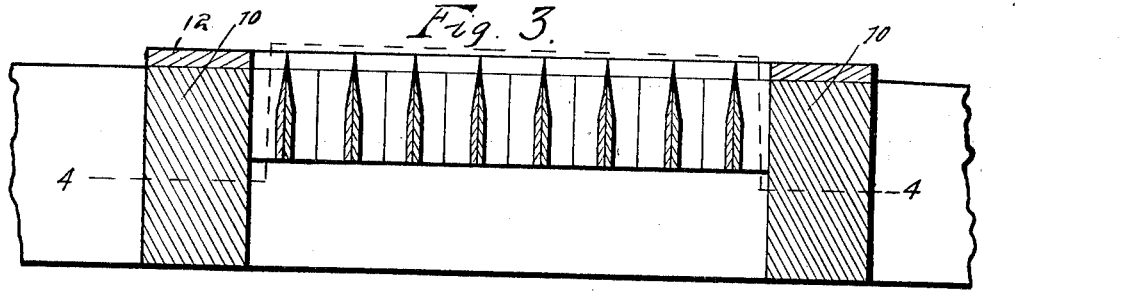
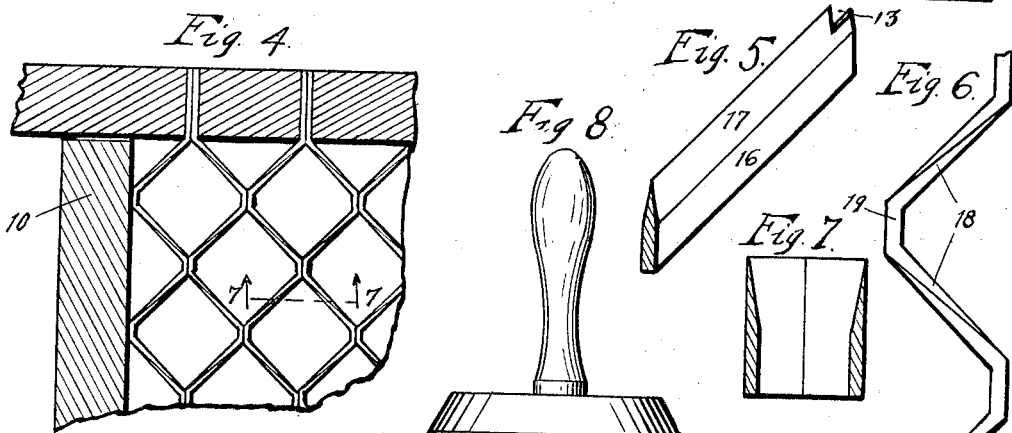
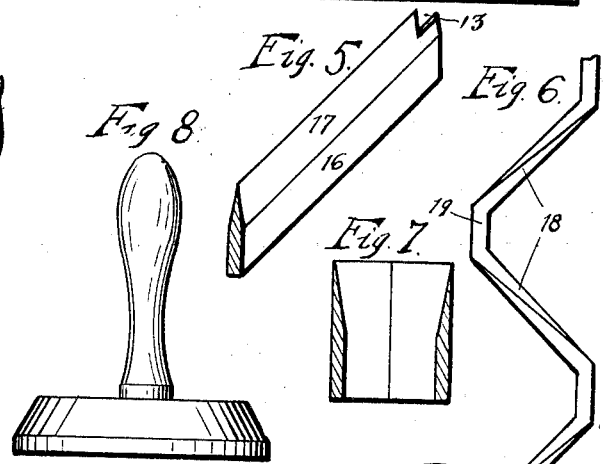
Witnesses
Inventor
Albert A. Dufner
By Orwig & Bair
attys.

UNITED STATES PATENT OFFICE.

ALBERT A. DUFNER, OF DES MOINES, IOWA.

VEGETABLE-CUTTER.

1,112,991.  Specification of Letters Patent.  Patented Oct. 6, 1914.

Application filed October 20, 1913. Serial No. 796,343.

*To all whom it may concern:*

Be it known that I, ALBERT A. DUFNER, a citizen of the United States, and resident of Des Moines, in the county of Polk and State of Iowa, have invented a certain new and useful Vegetable-Cutter, of which the following is a specification.

The object of my invention is to provide a vegetable cutter of extremely simple, durable and inexpensive construction.

A further object is to provide a vegetable cutter having a frame and blades mounted in the frame and so formed that when the parts of the device are properly assembled the cutting blades will be reinforced and supported by each other to form a vegetable cutter of great strength.

Still a further object is to provide such a vegetable cutter in which the blades may be formed with a die and readily and easily assembled into the completed cutter.

My invention consists in certain details, in the construction, combination and arrangement of the various parts of the device, whereby the objects contemplated are attained, as hereinafter more fully set forth, pointed out in my claims and illustrated in the accompanying drawings, in which—

Figure 1 shows a top or plan view of a vegetable cutter embodying my invention. Fig. 2 shows a side elevation of the same. Fig. 3 shows a vertical, sectional view, taken on the line 3—3 of Fig. 1. Fig. 4 shows a detail, sectional view, taken on the line 4—4 of Fig. 3. Fig. 5 shows a detail, perspective view of a portion of one of the blades before it is formed with the die. Fig. 6 shows a top or plan view of a portion of one of the blades after having been formed with the die. Fig. 7 shows a detail, vertical, sectional, view, taken on the line 7—7 of Fig. 4, and Fig. 8 shows a side elevation of the plunger or driver for use with my improved vegetable cutter.

In the accompanying drawings, I have used the reference numeral 10 to indicate the side frame members of my improved vegetable cutter. The frame members 10 are preferably rectangular in cross section and are arranged parallel to each other, as shown in Fig. 1. The side frame members 10 are received between the end frame members 11, which extend considerably beyond the members 10, as shown in Fig. 1, thereby forming handles and also supports for resting the vegetable cutter upon a receptacle. I provide a rectangular flat metal frame 12, designed to rest upon the frame member 10 and 11, as shown in Fig. 1, and to be detachably secured thereto by means of screws 15 or the like. The frame 12 is provided with a plurality of downwardly extending portions 14 at opposite sides to receive and engage the sides of the members 11. The portions 14 may be secured to the frame members by means of screws 15.

The blades 16 of my improved vegetable cutter are made originally in the form of straight blades with the sharp edge 17 beveled, preferably on each side, as shown in Fig. 5. In preparing the blades for instalment in the cutter, they are bent or shaped with a die or by other means into a series of corrugations, regular in shape, as shown in Figs. 1 and 4. Each corrugated portion comprises two sides 18 of what is substantially a right angle, with the exception that the portion of the blade which would be at the apex of the angle is so bent as to rest in a horizontal plane, parallel with the horizontal plane in which the ends of the blade lie. The last named portion is indicated in the Fig. 6 by the reference numeral 19. The beveled edges 17 of the blades are so pressed or formed in the die that the edge at each portion 19 is at the outside of the blade, as clearly shown in Fig. 6. The ends of the blades are left extending beyond the corrugated portions, as shown in Fig. 4, and are secured in slots in the side frame members 11, as shown in Figs. 2 and 4. The blades are arranged in series, adjacent to each other with the portions 19 of each blade alternately engaging similar portions 19 of the blades on either side so that the blades form a plurality of squares, as viewed from the top. The upper edges of the ends of the blades are provided with notches 13, so that the upper edges of said edges are flush with the surfaces of the members 11 and the sharp edges of the blades are level with the frame 12. After the blades have been formed and mounted in the members 11, one of the side members 10, which members are preferably made of comparatively soft wood, is secured in position and the screws 15 are extended through the lugs 14, the members 11 and into the ends of said member 10. The other side member 10 is then pressed against the outer blade at the other side until all blades are firmly pressed together. The side members 10 may then be held in position and the screws 15 inserted through the lugs 14, the end members 11 and into the second side member 11. It will be seen that the end members 10 may be varied somewhat in their relative positions, for securely pressing the blades into their proper positions.

It will readily be seen that by means of the construction hereinbefore described, I have provided a vegetable cutter of extremely simple and durable construction, which is comparatively inexpensive to manufacture. Such a vegetable cutter at the same time is one of great strength since each blade is supported by the other blades against lateral movement. A single operation of the die will form each blade and no special means are required for fastening the portions 19 together.

I preferably use with my vegetable cutter a plunger of the type shown in Fig. 8, comprising a flat disk with a suitable handle thereon, the face of the disk being roughened.

My improved vegetable cutter may be used for cutting or dicing into strips or cubes any kind of vegetable or fruit.

It will be understood that changes may be made in the details of the construction of my device and it is my intention to cover by this application any such changes which may be included within the scope of the appended claims.

I claim as my invention:

1. In a vegetable cutter, a frame, cutter blades therein, each having end portions mounted in the side frame members, the body of each blade being formed with a series of regular corrugations, the alternate portions of which are arranged to engage alternate portions of adjacent blades on either side, alternate portions of the blades at the sides of the device being engaged by the end frame members.

2. In a vegetable cutter, a frame, cutter blades therein, each having end portions mounted in the side frame members, the body of each blade being formed with a series of regular corrugations, the alternate portions of which are arranged to engage alternate portions of adjacent blades on either side, alternate portions of the blades at the sides of the device being engaged by the end frame members, said blades being formed with sharp upper edges so beveled that the sharp edges are together when the successive blades touch each other.

Des Moines, Iowa, August 12, 1913.

ALBERT A. DUFNER.

Witnesses:
L. ROBINSON,
M. WALLACE.

---

Copies of this patent may be obtained for five cents each, by addressing the "Commissioner of Patents, Washington, D. C."